US011264805B2

(12) United States Patent
Jiang et al.

(10) Patent No.: US 11,264,805 B2
(45) Date of Patent: Mar. 1, 2022

(54) METHOD FOR DYNAMICALLY AND ECONOMICALLY DISPATCHING POWER SYSTEM BASED ON OPTIMAL LOAD TRANSFER RATIO AND OPTIMAL GRID CONNECTION RATIO OF WIND POWER AND PHOTOVOLTAIC POWER

(71) Applicant: Changsha University of Science & Technology, Changsha (CN)

(72) Inventors: Fei Jiang, Changsha (CN); Lei Chen, Changsha (CN); Siju Cheng, Changsha (CN); Ze Ye, Changsha (CN)

(73) Assignee: CHANGSHA UNIVERSITY OF SCIENCE & TECHNOLOGY, Changsha (CN)

( * ) Notice: Subject to any disclaimer, the term of this patent is extended or adjusted under 35 U.S.C. 154(b) by 0 days.

(21) Appl. No.: 16/986,286

(22) Filed: Aug. 6, 2020

(65) Prior Publication Data

US 2021/0044117 A1  Feb. 11, 2021

(30) Foreign Application Priority Data

Aug. 9, 2019  (CN) .......................... 201910734752.3

(51) Int. Cl.
*H02J 3/38* (2006.01)
*H02J 3/00* (2006.01)
(Continued)

(52) U.S. Cl.
CPC ............ *H02J 3/381* (2013.01); *G05B 19/042* (2013.01); *H02J 3/008* (2013.01); *H02J 3/46* (2013.01);
(Continued)

(58) Field of Classification Search
CPC .... H02J 3/381; H02J 3/008; H02J 3/46; H02J 2300/28; H02J 2300/24; H02J 2203/10; H02J 2203/20; H02J 3/0075; H02J 3/00; G05B 19/042; G05B 2219/2639; G05B 2219/2619; Y02E 10/56; Y02E 10/76
See application file for complete search history.

(56) References Cited

U.S. PATENT DOCUMENTS

| 2011/0204720 A1* | 8/2011 | Ruiz ....................... B60L 53/14 307/66 |
| 2011/0295610 A1* | 12/2011 | Wei ........................ G06Q 50/06 705/1.1 |
| 2014/0172503 A1* | 6/2014 | Hammerstrom ... G06Q 30/0206 705/7.31 |

* cited by examiner

*Primary Examiner* — Charles R Kasenge
(74) *Attorney, Agent, or Firm* — Bayramoglu Law Offices LLC

(57) ABSTRACT

A method for dispatching a power system based on optimal load transfer ratio and optimal grid connection ratio of wind power and photovoltaic power includes: acquiring load data; drawing a load curve; defining a peak load period, a flat load period and a low load period, and calculating average loads of the peak load period, the flat load period and the low load period before a load transfer; determining value ranges of a peak-low load transfer ratio, a peak-flat load transfer ratio and a flat-low load transfer ratio; establishing an objective function considering generation cost of thermal power unit, wind power purchase cost, PV power purchase cost and compensation cost for consumer load transfer; introducing an immune algorithm to calculate grid connection ratio of wind power, grid connection ratio of PV power, peak-low load transfer ratio, peak-flat load transfer ratio and flat-low load ratio corresponding to a minimum operating cost.

7 Claims, 2 Drawing Sheets

(51) Int. Cl.
*H02J 3/46* (2006.01)
*G05B 19/042* (2006.01)
(52) U.S. Cl.
CPC ... *G05B 2219/2639* (2013.01); *H02J 2300/24* (2020.01); *H02J 2300/28* (2020.01)

METHOD FOR DYNAMICALLY AND ECONOMICALLY DISPATCHING POWER SYSTEM BASED ON OPTIMAL LOAD TRANSFER RATIO AND OPTIMAL GRID CONNECTION RATIO OF WIND POWER AND PHOTOVOLTAIC POWER

CROSS REFERENCE TO THE RELATED APPLICATIONS

This application is based upon and claims priority to Chinese Patent Application No. 201910734752.3, filed on Aug. 9, 2019, the entire contents of which are incorporated herein by reference.

TECHNICAL FIELD

The present invention belongs to the technical field of power distribution systems, and particularly relates to a method for dynamically and economically dispatching a power system based on an optimal load transfer ratio and an optimal grid connection ratio of wind power and photovoltaic (PV) power.

BACKGROUND

China's renewable energy installed capacity continues to grow rapidly. At the end of 2018, the installed capacity of renewable energy generation in China reached 729 million kilowatts, including 184 million kilowatts of wind power and 175 million kilowatts of photovoltaic (PV) power. However, existing systems for optimal dispatching of power function to optimize dispatching only on the front end where power is generated. Wind and solar energy are substantially curtailed as a result. Grid companies are therefore actively exploring a "source-grid-load" coordinated operation mode to promote consumption of renewable energy. Demand response is an important logistic upon which to base hub-type, platform-type and shared-type enterprise creation, strong smart grid (SSG) development and a ubiquitous power Internet of Things (UPIoT). It is necessary to fully exploit demand-side resources and strengthen the interaction between grid companies and power consumers to facilitate consumer choice. Grid companies have taken steps to incentivize power consumers to transfer loads, that is, to reduce power consumption during peak load periods and increase power consumption during flat or low load periods. These companies have also integrated the grid connection ratios of wind power and PV power into their business models to maximize economic benefits of system operation. Such realignment can substantially reduce the peak-to-low load difference, increase the renewable energy consumption and the flexibility of power system dispatching, and achieve a "win-win" for grid companies and power consumers alike.

Currently, however, the demand-side resources are not fully developed in the power system operation. Instead, the allocation of resources is disproportionately optimized by the dispatching of power sources on the generation side, i.e., the front end, which makes the problem of wind and solar energy curtailment still very serious. Therefore, it is highly desirable to provide a new reliable method for optimally dispatching a power system.

SUMMARY

An objective of the present invention is to provide a method for dynamically and economically dispatching a power system based on an optimal load transfer ratio and an optimal grid connection ratio of wind power and photovoltaic (PV) power. The present invention simultaneously takes into account the resources on both generation and consumption sides, further mitigating the curtailment of wind and solar energy and increasing the renewable energy consumption and the flexibility of power system dispatching.

To achieve the above purpose, the present invention provides a method for dynamically and economically dispatching a power system based on an optimal load transfer ratio and an optimal grid connection ratio of wind power and photovoltaic (PV) power, including the following steps:

S1: acquiring initial data by taking a day with 24 periods (each period being 1 h) as a dispatching period, wherein the initial data includes output power $P_w$ of a wind turbine in the system, output power $P_{pv}$ of a PV power station in the system and load power $P_L$ of the system;

S2: drawing a wind power output curve, a PV power output curve and a load curve according to the acquired initial data;

S3: defining a peak period $T_p$, a flat period $T_f$ and a low period $T_l$ according to the drawn load curve of the system, and calculating an average load $P_{p,ave}$ of the peak period, an average load $P_{f,ave}$ of flat period, and an average load $P_{l,ave}$ of the low period before a load transfer;

S4: determining a value range of a peak-low load transfer ratio $\mu_{pl}$, a value range of a peak-flat load transfer ratio $\mu_{pf}$ and a value range of a flat-low load transfer ratio $\mu_{fl}$ respectively according to the $P_{p,ave}$, $P_{f,ave}$ and $P_{l,ave}$ in S3;

S5: assuming that total load power before and after the load transfer is unchanged, then calculating a system load after the load transfer, and establishing an objective function minC about a system operating cost after the load transfer, the system operating cost including: a generation cost $C_G$ of a thermal power unit, a wind power purchase cost $C_W$, a PV power purchase cost $C_{PV}$ and a compensation cost $C_M$ for consumer load transfer;

S6: entering constraints, including: system power balance constraint, positive and negative spinning reserve constraint, thermal power unit output constraint, thermal power unit ramp constraint, wind power grid-connection ratio $\mu_w$ constraint, PV power grid-connection ratio $\mu_{pv}$ constraint, peak-low load transfer ratio $\mu_{pl}$ constraint, peak-flat load transfer ratio $\mu_{pf}$ constraint and flat-low load transfer ratio $\mu_{fl}$ constraint;

S7: introducing an immune algorithm (IA) to solve and generate an initial population; performing immune operations on the population, including selection, cloning, mutation and cloning suppression; refreshing the population until a termination condition is met, and obtaining $\mu_w$, $\mu_{pv}$, $\mu_{pl}$, $\mu_{pf}$ and $\mu_{fl}$ corresponding to a minimum system operating cost.

Further, in S1, the output power $P_w$ of the wind turbine in the system, the output power $P_{pv}$ of the PV power station in the system and the load power $P_L$ of the system are expressed as follows:

$$P_w = \{P_{w1}, P_{w2}, \Lambda, P_{wt}, \Lambda, P_{w24}\}$$

$$P_{pv} = \{P_{pv1}, P_{pv2}, \Lambda, P_{pvt}, \Lambda, P_{pv24}\}$$

$$P_L\{P_{L1}, P_{L2}, \Lambda, P_{Lt}, \Lambda, P_{L24}\}$$

where, $P_{wt}$ represents output power of the wind turbine in a t-th period, $P_{pvt}$ represents output power of the PV power station in the t-th period, and $P_{Lt}$ represents load power in the t-th period, t=1, 2, . . . , 24.

Further, the peak period $T_p$, the flat period $T_f$ and the low period $T_l$ in S3 are calculated as follows:

S31: calculating a total daily load $Q_L$, $$Q_L = \sum_{t=1}^{24} P_{Lt};$$

S32: calculating an hourly average load $Q_L/24$;

S33: regarding the t-th period as the peak period $T_p$ when $P_{Lt} > (1+k) \cdot (Q_L/24)$ regarding the t-th period as the low period $T_l$ when $P_{Lt} < (1-k) \cdot (Q_L/24)$, and regarding the t-th period as the flat period $T_f$ when $(1-k) \cdot (Q_L/24) \leq P_{Lt} \leq (1+k) \cdot (Q_L/24)$, wherein k is a dividing factor of a peak-low period, a flat-low period and a low period, $0 < k < 1$.

Further, S4 of determining the value range of the peak-low load transfer ratio $\mu_{pl}$, the value range of the peak-flat load transfer ratio $\mu_{pf}$ and the value range of the flat-low load transfer ratio $\mu_{fl}$ respectively according to the $P_{p,ave}$, $P_{f,ave}$ and $P_{l,ave}$ in S3 is as follows:

$$\begin{cases} \mu_{pl} \in \left[0, \dfrac{P_{p,ave} - P_{l,ave}}{P_{p,ave}}\right] \\ \mu_{pf} \in \left[0, \dfrac{P_{p,ave} - P_{f,ave}}{P_{p,ave}}\right] \\ \mu_{fl} \in \left[0, \dfrac{P_{f,ave} - P_{l,ave}}{P_{f,ave}}\right] \end{cases}.$$

Further, in S5, the objective function minC is expressed as:

$$\min C = C_G + C_W + C_{PV} + C_M$$

where, $C_W = \theta_w \times Q_w$, $\theta_w$ and $Q_w$ represent an on-grid wind power tariff and on-grid wind power, respectively;

$$Q_w = \mu_w \times \sum_{t=1}^{24} P_{wt},$$

$\mu_w$ represents a grid connection ratio of wind power;

$C_{PV} = \theta_{pv} \times Q_{pv}$, $\theta_{pv}$ and $Q_{pv}$ represent an on-grid PV power tariff and on-grid PV power, respectively;

$$Q_{pv} = \mu_{pv} \times \sum_{t=1}^{24} P_{pvt},$$

$\mu_{pv}$ represents a grid connection ratio of PV power;

$$C_M = \begin{cases} \theta_{m1} \times Q_{tran}, & Q_{tran} \leq \lambda Q_L \\ \theta_{m1} \times \lambda Q_L + \theta_{m2} \times (Q_{tran} - \lambda Q_L), & Q_{tran} > \lambda Q_L \end{cases},$$

$\lambda$ is a dividing factor of a conventional load and a deep load, $0 < \lambda < 1$; $Q_{tran}$ is a transferred load, $$Q_{tran} = \sum_{t=1}^{24} (P_{Dt} - P_{Lt});$$

$\theta_{m1}$ is a compensation cost for a conventional load transfer; $\theta_{m2}$ is a compensation cost for a deep load transfer; the load of the system in the t-th period after the load transfer is expressed as:

$$P_{Dt} = \begin{cases} P_{Lt} + \mu_{pl} P_{p,ave} + \mu_{fl} P_{f,ave}, & t \in T_l \\ P_{Lt} + \mu_{pf} P_{p,ave} - \mu_{fl} P_{f,ave}, & t \in T_f \\ P_{Lt} - \mu_{pl} P_{p,ave} - \mu_{pf} P_{f,ave}, & t \in T_p \end{cases};$$

under conventional peak shaving, the generation cost of the thermal power unit includes a coal consumption cost, and under deep peak shaving, the generation cost of the thermal power unit includes a coal consumption cost, a life loss cost and an oil input cost, $$C_G = \begin{cases} C_T(P_t), & P_{min} \leq P_t \leq P_{max} \\ C_T(P_t) + C_{life}(P_t), & P_n \leq P_t < P_{min} \\ C_T(P_t) + C_{life}(P_t) + C_u(P_t), & P_m \leq P_t < P_n \end{cases},$$

where $P_{max}$ and $P_{min}$ are respectively an maximum output and a minimum output of the thermal power unit; $P_n$ is a steady combustion load of the unit under non-oil-input deep peak shaving; $P_m$ is a steady combustion limit load of the unit under oil-input deep peaking shaving; $P_t$ is output power of the thermal power unit in the t-th period;

the coal consumption cost is $$C_T(P_t) = \sum_{t=1}^{24} (aP_t^2 + bP_t + c),$$

a, b and c being coal consumption cost coefficients of the thermal power unit;

the life loss cost of the unit under variable-load peak shaving is calculated by $$C_{life}(P_t) = \frac{\eta C_B}{2N_f(P_t)}$$

by referring to a Manson-Coffin equation, where $\eta$ is an operation influence coefficient of the thermal power unit, indicating the degree of influence of different operating states on unit loss; $N_f(P_t)$ is a number of rotor cracking cycles determined by a low-cycle fatigue curve of a rotor; $C_B$ is a cost of buying the thermal power unit;

the oil input cost of the unit is expressed as $C_u(P_t) = C_{oil} \theta_{oil}$, where $C_{oil}$ is oil consumption of the unit during steady combustion, and $\theta_{oil}$ is an oil price for the season.

Further, in S6, the constraints after the load transfer, namely the system power balance constraint, positive and negative spinning reserve constraint, thermal power unit output constraint, thermal power unit ramp constraint, wind power grid-connection ratio constraint, PV power grid-connection ratio constraint, peak-low load transfer ratio $\mu_{pl}$ constraint, peak-flat load transfer ratio $\mu_{pf}$ constraint and flat-low load transfer ratio $\mu_{fl}$ constraint are respectively:

$P_t + P_{wt} + P_{pvt} = P_{Dt}$ (system power balance constraint)

$P_{max} - P_t \geq \eta_1 P_{Dt} + \eta_2 P_{wt}$ (positive spinning reserve constraint)

$P_t - P_{min} \geq \eta_3 P_{Dt} + \eta_4 P_{wt}$ (negative spinning reserve constraint)

$P_{min} \leq P_t \leq P_{max}$ (thermal power unit output constraint)

$\eta_{down} \leq P_t - P_{t-1} \leq \eta_{up}$ (thermal power unit ramp constraint)

$0 \leq \mu_w \leq 1$ (wind power grid-connection ratio constraint)

$0 \leq \mu_{pv} \leq 1$ (PV power grid-connection ratio constraint)

$0 \leq \mu_{pl} \leq \dfrac{P_{p,ave} - P_{l,ave}}{P_{p,ave}}$ (peak-low load transfer ratio constraint)

$0 \leq \mu_{pf} \leq \dfrac{P_{p,ave} - P_{f,ave}}{P_{p,ave}}$ (peak-flat load transfer ratio constraint)

$0 \leq \mu_{fl} \leq \dfrac{P_{f,ave} - P_{l,ave}}{P_{f,ave}}$ (flat-low load transfer ratio constraint)

where, $\eta_1$ and $\eta_3$ represent up and down-spinning reserve coefficients of the system to the load, respectively; $\eta_2$ and $\eta_4$ represent up and down-spinning reserve coefficients of the system to the output power of the wind turbine, respectively; $\eta_{down}$ and $\eta_{up}$ represent a minimum ramp-down rate and a maximum ramp-up rate of the thermal power unit, respectively; $P_{Dt}$ is the load of the system in the t-th period after the load transfer; $P_{t-1}$ is the output power of the thermal power unit in a (t−1)-th period.

Further, S7 includes:

S71: generating an initial population as an initial antibody population, and evaluating individuals with the system operating cost as an antibody affinity operator;

wherein, the initial population is generated by randomly taking values of the variables $\mu_w$, $\mu_{pv}$, $\mu_{pl}$, $\mu_{pf}$ and $\mu_{fl}$ within the respective value ranges as initial values;

the initial antibody population is a vector composed of $\mu_w$, $\mu_{pv}$, $\mu_{pl}$, $\mu_{pf}$ and $\mu_{fl}$;

S72: performing immune operations on the population, including immune selection, cloning, mutation and cloning suppression:

immune selection: selecting high-quality antibodies according to calculation results of antibody affinities and concentration in the population, and activating the high-quality antibodies, wherein the antibody affinities are values of the system operating cost; the concentration is the similarity of each value of the system operating cost; the high-quality antibodies refer to the corresponding $\mu_w$, $\mu_{pv}$, $\mu_{pl}$, $\mu_{pf}$ and $\mu_{fl}$ in the current population in case of the minimum system operating cost;

cloning: cloning the activated antibodies to obtain several copies;

mutation: performing mutation operations on the cloned copies to mutate the affinities thereof;

cloning suppression: reselecting mutation results, suppressing antibodies with a low affinity, and retaining mutation results of antibodies with a high affinity, wherein the antibodies with a low affinity refer to $\mu_w$, $\mu_{pv}$, $\mu_{pl}$, $\mu_{pf}$ and $\mu_{fl}$ corresponding to a larger value of the system operating cost; and S73: refreshing the population and replacing an antibody with a lower affinity in the population with a randomly generated new antibody to form a new population; determining whether a termination condition is met, that is, whether a current number of iterations is greater than or equal to a maximum number of iterations; if yes, converging to obtain $\mu_w$, $\mu_{pv}$, $\mu_{pl}$, $\mu_{pf}$ and $\mu_{fl}$ corresponding to the minimum system operating cost; otherwise, returning to S72.

By utilizing the resources on the demand side, that is, taking measures to compensate power consumers, the present invention prompts power consumers to transfer loads. In addition, the present invention greatly reduces the peak-to-low load difference, increases the renewable energy consumption and the flexibility of power system dispatching, and achieves a "win-win" for grid companies and power consumers.

BRIEF DESCRIPTION OF THE DRAWINGS

To describe the technical solutions in the embodiments of the present invention or in the prior art more clearly, the accompanying drawings required for describing the embodiments or the prior art are briefly described below. Apparently, the accompanying drawings in the following description merely show some embodiments of the present invention, and a person of ordinary skill in the art may still derive other drawings from these accompanying drawings without creative efforts.

DETAILED DESCRIPTION OF THE EMBODIMENTS

The technical solutions in the embodiments of the present invention are clearly and completely described below with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts should fall within the protection scope of the present invention.

Figure 1:
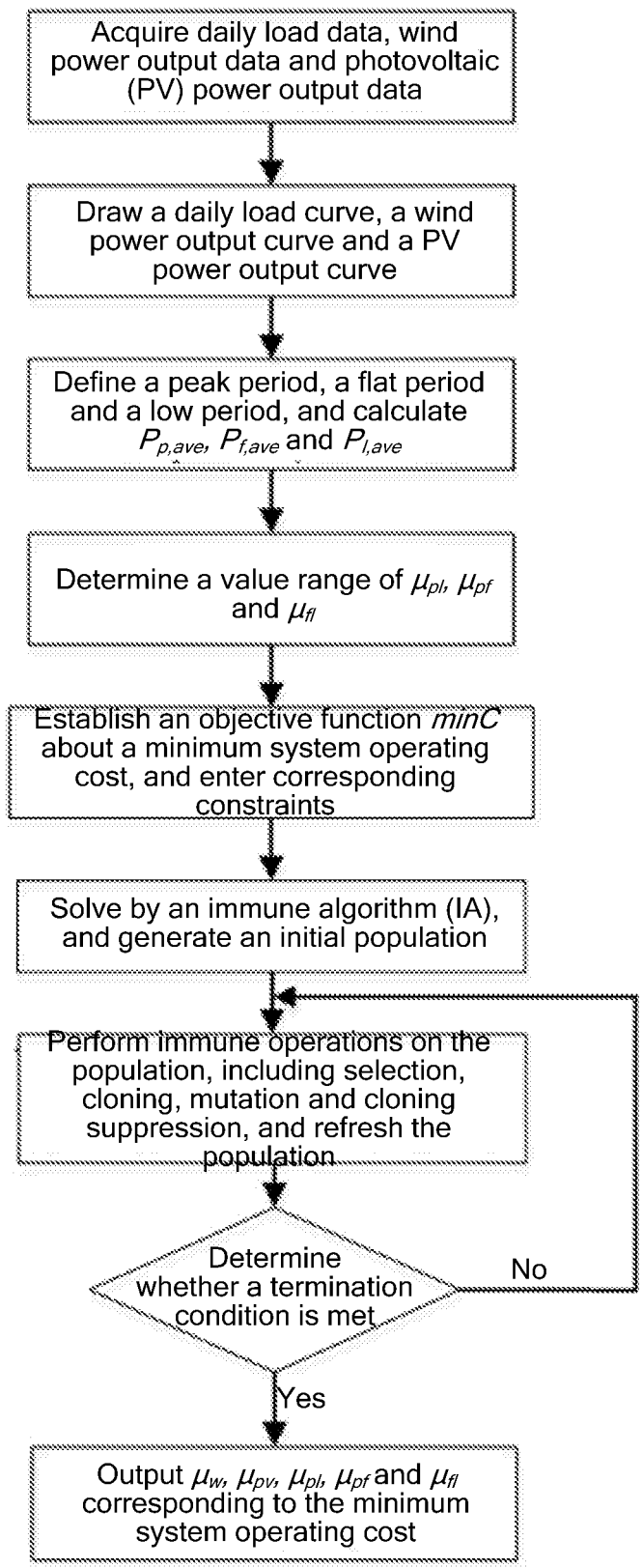
FIG. 1 is a flowchart of a method according to the present invention.

FIG. 1 shows a flowchart of the present invention. A method for dynamically and economically dispatching a power system based on an optimal load transfer ratio and an optimal grid connection ratio of wind power and photovoltaic (PV) power includes: first acquiring load data; drawing a load curve; defining a peak load period, a flat load period and a low load period, and calculating an average load of the peak load period, an average load of the flat load period and an average load of the low load period; determining a value range of a peak-low load transfer ratio, a value range of a peak-flat load transfer ratio and a value range of a flat-low load transfer ratio; establishing an objective function that comprehensively considers a generation cost of a thermal power unit, a wind power purchase cost, a PV power purchase cost and a compensation cost for consumer load transfer; introducing an immune algorithm (IA) to calculate a grid connection ratio of wind power, a grid connection ratio of PV power, the peak-low load transfer ratio, the peak-flat load transfer ratio and the flat-low load ratio corresponding to a minimum system operating cost. Specifically, this method includes the following steps:

S1: by taking a day with 24 periods (each period being 1 h) as a dispatching period, acquiring initial data, wherein the initial data includes output power of a wind turbine in the system, output power of a PV power station in the system and load power of the system.

Output power $P_w$ of the wind turbine in the system, output power $P_{pv}$ of the PV power station in the system and load power $P_L$ of the system are expressed as follows:

$$P_w = \{P_{w1}, P_{w2}, \Lambda, P_{wt}, \Lambda, P_{w24}\}$$

$$P_{pv} = \{P_{pv1}, P_{pv2}, \Lambda, P_{pvt}, \Lambda, P_{pv24}\}$$

$$P_L\{P_{L1}, P_{L2}, \Lambda, P_{Lt}, \Lambda, P_{L24}\}$$

$P_{wt}$ represents output power of the wind turbine in a t-th period, $P_{pvt}$ represents output power of the PV power station in the t-th period, and $P_{Lt}$ represents load power in the t-th period, t=1, 2, . . . , 24.

S2: drawing a wind power output curve, a PV power output curve and a load curve according to the acquired initial data.

S3: defining a peak period $T_p$, a flat period $T_f$ and a low period $T_l$ according to the drawn load curve of the system, and calculating an average load $P_{p,ave}$ of the peak period, an average load $P_{f,ave}$ of the flat period, an average load $P_{l,ave}$ of the low period before a load transfer.

The peak period $T_p$, the flat period $T_f$ and the low period $T_l$ in S3 are calculated as follows:

S31: calculating a total daily load $Q_L$, $$Q_L = \sum_{t=1}^{24} P_{Lt}.$$

S32: calculating an hourly average load $Q_L/24$.

S33: regarding the t-th period as the peak period $T_p$ when $P_{Lt} > (1+k) \cdot (Q_L/24)$, regarding the t-th period as the low period $T_l$ when $P_{Lt} < (1-k) \cdot (Q_L/24)$ and regarding the t-th period as the flat period $T_f$ when $(1-k) \cdot (Q_L/24) \le P_{Lt} \le (1+k) \cdot (Q_L/24)$, wherein k is a dividing factor of a peak-low period, a flat-low period and a low period, 0<k<1.

S4: determining a value range of a peak-low load transfer ratio $\mu_{pl}$, a value range of a peak-flat load transfer ratio $\mu_{pf}$ and a value range of a flat-low load transfer ratio $\mu_{fl}$ respectively according to the $P_{p,ave}$, $P_{f,ave}$ and $P_{l,ave}$ in S3, as follows:

$$\begin{cases} \mu_{pl} \in \left[0, \frac{P_{p,ave} - P_{l,ave}}{P_{p,ave}}\right] \\ \mu_{pf} \in \left[0, \frac{P_{p,ave} - P_{f,ave}}{P_{p,ave}}\right] \\ \mu_{fl} \in \left[0, \frac{P_{f,ave} - P_{l,ave}}{P_{f,ave}}\right] \end{cases}.$$

S5: assuming that total load power before and after the load transfer is unchanged, then calculating a system load after the load transfer, and establishing an objective function minC about a system operating cost after the load transfer, the system operating cost including: a generation cost of a thermal power unit, a wind power purchase cost, a PV power purchase cost and a compensation cost for consumer load transfer.

The objective function is expressed as:

$$\min C = C_G + C_W + C_{PV} + C_M$$

$C_G$, $C_W$, $C_{PV}$ and $C_M$ represent the generation cost of the thermal power unit, the wind power purchase cost, the PV power purchase cost and the compensation cost for consumer load transfer, respectively.

$C_W = \theta_w \times Q_w$, where $\theta_w$ and $Q_w$ represent an on-grid wind power tariff and on-grid wind power, respectively.

$$Q_w = \mu_w \times \sum_{t=1}^{24} P_{wt},$$

where $\mu_w$ represents a grid connection ratio of wind power.

$C_{PV} = \theta_{pv} \times Q_{pv}$, where $\theta_{pv}$ and $Q_{pv}$ represent an on-grid PV power tariff and on-grid PV power, respectively.

$$Q_{pv} = \mu_{pv} \times \sum_{t=1}^{24} P_{pvt},$$

where $\mu_{pv}$ represents a grid connection ratio of PV power.

$$C_M = \begin{cases} \theta_{m1} \times Q_{tran}, & Q_{tran} \le \lambda Q_L \\ \theta_{m1} \times \lambda Q_L + \theta_{m2} \times (Q_{tran} - \lambda Q_L), & Q_{tran} > \lambda Q_L \end{cases},$$

where $\lambda$ is a dividing factor of a conventional load and a deep load, 0<$\lambda$<1; $Q_{tran}$ is a transferred load, $$Q_{tran} = \sum_{t=1}^{24} (P_{Dt} - P_{Lt});$$

$\theta_{m1}$ is a compensation cost for a conventional load transfer; $\theta_{m2}$ is a compensation cost for a deep load transfer. The load of the system in the t-th period after the load transfer is expressed as:

$$P_{Dt} = \begin{cases} P_{Lt} + \mu_{pl} P_{p,ave} + \mu_{fl} P_{f,ave}, & t \in T_l \\ P_{Lt} + \mu_{pf} P_{p,ave} - \mu_{fl} P_{f,ave}, & t \in T_f \\ P_{Lt} - \mu_{pl} P_{p,ave} - \mu_{pf} P_{f,ave}, & t \in T_p \end{cases}.$$

Under conventional peak shaving, the generation cost of the thermal power unit includes a coal consumption cost, and under deep peak shaving, the generation cost of the thermal power unit includes a coal consumption cost, a life loss cost and an oil input cost.

$$C_G = \begin{cases} C_T(P_t), & P_{min} \le P_t \le P_{max} \\ C_T(P_t) + C_{life}(P_t), & P_n \le P_t < P_{min} \\ C_T(P_t) + C_{life}(P_t) + C_u(P_t), & P_m \le P_t < P_n \end{cases},$$

where $P_{max}$ and $P_{min}$ are respectively an maximum output and a minimum output of the thermal power unit; $P_n$ is a steady combustion load of the unit under non-oil-input deep peak shaving; $P_m$ is a steady combustion limit load of the unit under oil-input deep peaking shaving; $P_t$ is output power of the thermal power unit in the t-th period.

Figure 2:
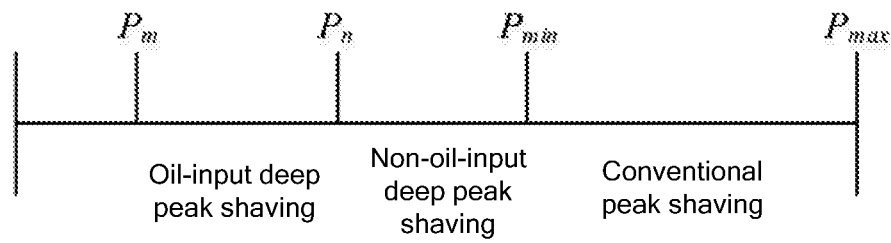
FIG. 2 is a peak shaving process of a thermal power unit according to the present invention.

FIG. 2 shows a peak shaving process, where:
(1) The coal consumption cost is $$C_T(P_t) = \sum_{t=1}^{24} (aP_t^2 + bP_t + c),$$

a, b and c are coal consumption cost coefficients of the thermal power unit.

(2) The unit loss cost under variable-load peak shaving is calculated by $$C_{life}(P_t) = \frac{\eta C_B}{2N_f(P_t)}$$

by referring to a Manson-Coffin equation, where $\eta$ is an operation influence coefficient of the thermal power unit, indicating the degree of influence of different operating states on unit loss; $N_f(P_t)$ is a number of rotor cracking cycles determined by a low-cycle fatigue curve of a rotor; $C_B$ is a cost of buying the thermal power unit.

(3) The oil input cost of the unit is expressed as $C_u(P_t)=C_{oil}\theta_{oil}$, where $C_{oil}$ is oil consumption of the unit during steady combustion, and $\theta_{oil}$ is an oil price for the season.

S6: entering constraints, including: system power balance constraint, positive and negative spinning reserve constraint, thermal power unit output constraint, thermal power unit ramp constraint, wind power grid-connection ratio $\mu_w$ constraint, PV power grid-connection ratio $\mu_{pv}$ constraint, peak-low load transfer ratio $\mu_{pl}$ constraint, peak-flat load transfer ratio $\mu_{pf}$ constraint and flat-low load transfer ratio $\mu_{fl}$ constraint.

In S6, the system power balance constraint, the positive and negative spinning reserve constraint, the thermal power unit output constraint, the thermal power unit ramp constraint, the wind power grid-connection ratio constraint and the PV power grid-connection ratio constraint after the load transfer are respectively expressed as:

$P_t + P_{wt} + P_{pvt} = P_{Dt}$ $P_{max} - P_t \geq \eta_1 P_{Dt} + \eta_2 P_{wt}$ $P_t - P_{min} \geq \eta_3 P_{Dt} + \eta_4 P_{wt}$ $P_{min} \leq P_t \leq P_{max}$ $\eta_{down} \leq P_t - P_{t-1} \leq \eta_{up}$ $0 \leq \mu_w \leq 1$ $0 \leq \mu_{pv} \leq 1$ $\eta_1$ and $\eta_3$ represent up and down-spinning reserve coefficients of the system to the load, respectively; $\eta_2$ and $\eta_4$ represent up and down-spinning reserve coefficients of the system to the output power of the wind turbine, respectively; $\eta_{down}$ and $\eta_{up}$ represent a minimum ramp-down rate and a maximum ramp-up rate of the thermal power unit, respectively; $P_{Dt}$ is the load of the system in the t-th period after the load transfer; $P_{t-1}$ is the output power of the thermal power unit in a (t−1)-th period.

S7: introducing an IA to solve and generate an initial population; performing immune operations on the population, including selection, cloning, mutation and cloning suppression; refreshing the population until a termination condition is met, and obtaining $\mu_w$, $\mu_{pv}$, $\mu_{pl}$, $\mu_{pf}$ and $\mu_{fl}$ corresponding to a minimum system operating cost.

Specifically:

S71: randomly taking values of the variables $\mu_w$, $\mu_{pv}$, $\mu_{pl}$, $\mu_{pf}$ and $\mu_{fl}$ as initial values within the respective value ranges to generate an initial population as an initial antibody population (a vector composed of $\mu_w$, $\mu_{pv}$, $\mu_{pl}$, $\mu_{pf}$ and $\mu_{fl}$), and evaluating the individuals with the system operating cost as an antibody affinity operator.

S72: performing immune operations on the population, including immune selection, cloning, mutation and cloning suppression:

Immune selection: selecting high-quality antibodies according to calculation results of antibody affinities and concentration in the population, and activating the high-quality antibodies. The antibody affinities are values of the system operating cost. The concentration is the similarity of each value of the system operating cost. If the concentration is too high, the operating costs of the current population are similar, and the search process will be concentrated in a small area, which is not conducive to the global search for optimal antibodies. The high-quality antibodies refer to the corresponding $\mu_w$, $\mu_{pv}$, $\mu_{pl}$, $\mu_{pf}$ and $\mu_{fl}$ in the current population in case of the minimum system operating cost.

Cloning: cloning the activated antibodies ($\mu_w$, $\mu_{pv}$, $\mu_{pl}$, $\mu_{pf}$ and $\mu_{fl}$ corresponding to the minimum system operating cost) to obtain several copies.

Mutation: performing mutation operations on the cloned copies to mutate the affinities thereof.

Cloning suppression: reselecting mutation results, suppressing antibodies with a low affinity, and retaining mutation results of antibodies with a high affinity. The low affinity refers to a larger value instead of the minimum value of the system operating cost. The antibodies with a low affinity refer to $\mu_w$, $\mu_{pv}$, $\mu_{pl}$, $\mu_{pf}$ and $\mu_{fl}$ corresponding to a larger value of the system operating cost. The high affinity refers to the minimum value of the system operating cost.

S73: refreshing the population and replacing an antibody with a lower affinity in the population with a randomly generated new antibody to form a new population; determining whether a termination condition is met, that is, whether a current number of iterations is greater than or equal to a maximum number of iterations; if yes, converging to obtain $\mu_w$, $\mu_{pv}$, $\mu_{pl}$, $\mu_{pf}$ and $\mu_{fl}$ corresponding to the minimum system operating cost; otherwise, returning to S72.

The present invention first gives the definitions and calculation methods of the wind power grid-connection ratio, the PV power grid-connection ratio, the peak-low load transfer ratio, the peak-flat load transfer ratio and the flat-low load transfer ratio. The invention then determines the system load after the load transfer based on the principle that the total load power is unchanged before and after the load transfer, and establishes an objective function and constraints after the load transfer. Finally, the present invention introduces an IA to calculate the optimal values of the wind power grid-connection ratio, the PV power grid-connection ratio, the peak-low load transfer ratio, the peak-flat load transfer ratio and the flat-low load transfer ratio and the minimum system operating cost.

In the present invention, when the wind power and PV power in the power system are 100% connected to the grid, the economic benefits of the power system operation are not necessarily maximized. Especially during the low load period, the full consumption of the renewable wind power and PV power requires the shutdown of a large number of thermal power units, which greatly increases the cost of peak shaving. The curtailment of a certain percentage of wind power and PV power can reduce the cost of peak shaving and frequency control of the thermal power units and increase the flexibility of power system dispatching. A load transfer, for example, a transfer of part of the peak load to the low load, can greatly reduce the peak-low load difference and the start-stop cost of the thermal power units. Since the load transfer needs to give consumers a corresponding compensation cost, the system operating cost must have a minimum. At this time, the wind power grid-connection ratio, the PV power grid-connection ratio, the peak-low load transfer ratio, the peak-flat load transfer ratio and the flat-low load transfer ratio are optimal.

Figure 3:
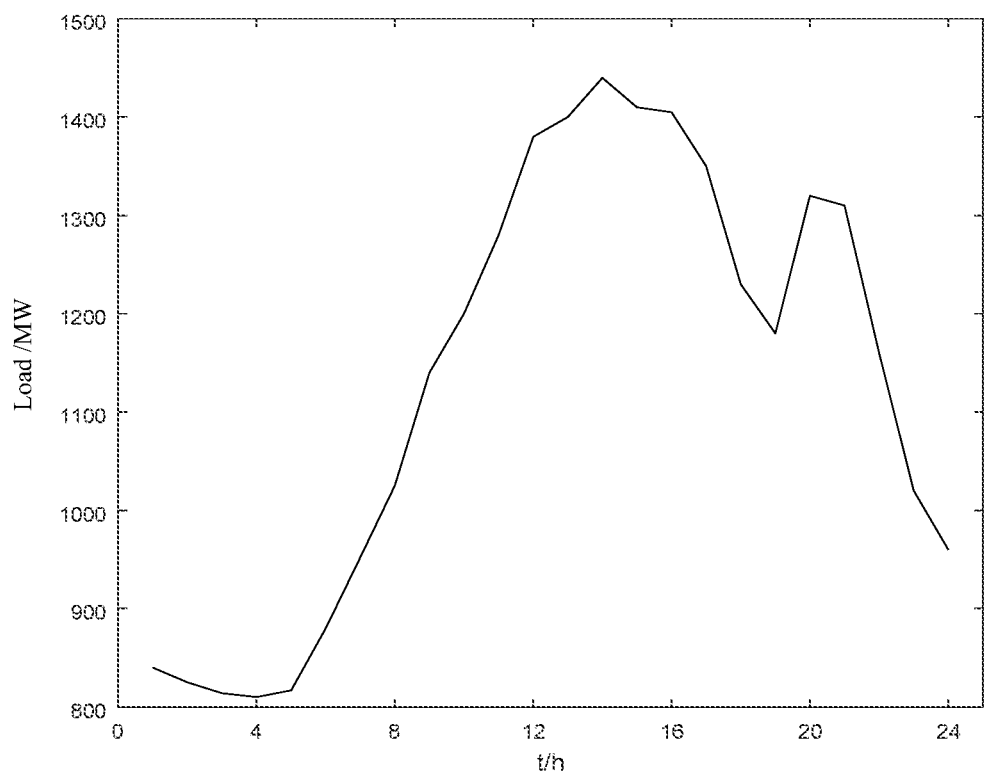
FIG. 3 is a daily load curve.

FIG. 3 is a curve drawn by load data (before a load transfer) within a dispatching period (24 h a day), showing the load (before the load transfer) of each time period.

Table 1 shows the wind power output data in a dispatching period, Table 2 shows the PV power output data in a dispatching period, Table 3 shows the parameters of a thermal power unit, and Table 4 shows a comparison of new energy consumption and system operating cost. Under the traditional optimized dispatching method, the renewable energy consumption is 3843.7 MW·h, and the system operating cost is 386,400 yuan. Under the optimized dispatching method that only considers the optimal grid connection ratio of wind power and PV power or the optimal load transfer ratio, the renewable energy consumption increases by 274.6 MW·h and 549.1 MW·h, respectively, and the system operating cost decreases by 43,600 yuan and 62,700 yuan, respectively. Under the optimized dispatching method that considers both the optimal grid connection ratio of wind power and PV power and the optimal load transfer ratio, the renewable energy consumption reaches 5216.5 MW·h, and the minimum system operating cost is 281,500 yuan. The optimized dispatching method that considers both the optimal grid connection ratio of wind power and PV power and the optimal load transfer ratio greatly increases the new energy consumption and decreases the system operating cost.

TABLE 1

Wind power output forecast

| Time Period | Wind Power Output/MW |
|---|---|
| 1 | 252 |
| 2 | 247.5 |
| 3 | 244 |
| 4 | 243 |
| 5 | 240 |
| 6 | 225 |
| 7 | 210 |
| 8 | 180 |
| 9 | 135 |
| 10 | 120 |
| 11 | 108 |
| 12 | 111 |
| 13 | 129 |
| 14 | 114 |
| 15 | 129 |
| 16 | 150 |
| 17 | 180 |
| 18 | 210 |
| 19 | 225 |
| 20 | 222 |
| 21 | 231 |
| 22 | 240 |
| 23 | 255 |
| 24 | 270 |

TABLE 2

PV power output forecast

| Time Period | PV Power Output/MW |
|---|---|
| 7 | 5.5 |
| 8 | 25 |
| 9 | 65 |
| 10 | 100 |
| 11 | 115 |
| 12 | 125 |
| 13 | 115 |
| 14 | 110 |
| 15 | 80 |
| 16 | 50 |
| 17 | 25 |
| 18 | 5 |

TABLE 3

Parameters of thermal power unit

| Parameter | a | b | c | $P_{max}$ | $P_{min}$ | $\eta_{up}$ | $\eta_{down}$ |
|---|---|---|---|---|---|---|---|
| Value | 0.00285 | 9.8 | 131 | 380 | 120 | 4.20 | −4.20 |

TABLE 4

Comparison of new energy consumption and system operating cost

| Dispatching Method | Renewable Energy Consumption/ MW · h | System Operating Cost/yuan |
|---|---|---|
| Traditional optimized dispatching | 3843.7 | 386,400 |
| Optimal dispatching only considering optimal grid connection ratio of wind power and PV power | 4118.3 | 342,800 |
| Optimal dispatching only considering optimal load transfer ratio | 4392.8 | 323,700 |
| Optimal dispatching considering both optimal grid connection ratio of wind power and PV power and optimal load transfer ratio | 5216.5 | 281,500 |

Each embodiment of the present specification is described in a related manner, each embodiment focuses on the difference from other embodiments, and the same and similar parts between the embodiments may refer to each other. For a system embodiment, since it corresponds to the method embodiment, the description is relatively simple, and reference can be made to the description of the method embodiment.

The above described are merely preferred embodiments of the present invention, and are not intended to limit the protection scope of the present invention. Any modifications, equivalent substitutions and improvements made within the spirit and scope of the present invention should fall within the protection scope of the present invention.

What is claimed is:

1. A method for dynamically and economically dispatching a power system based on an optimal load transfer ratio and an optimal grid connection ratio of wind power and photovoltaic (PV) power, comprising the following steps:

S1: acquiring initial data by taking a day with 24 periods, wherein each period is 1 hour, as a dispatching period, wherein the initial data comprises obtaining an output power $P_w$ from a wind turbine in the power system, obtaining an output power $P_{pv}$ from a PV power station in the power system and obtaining a load power $P_L$ from the power system;

S2: drawing a wind power output curve, a PV power output curve and a load curve according to the initial data;

S3: defining a peak period $T_p$, a flat period $T_f$ and a low period $T_l$ according to the load curve of the power system, and calculating an average load $P_{p,ave}$ of the peak period, an average load $P_{f,ave}$ of the flat period, an average load $P_{l,ave}$ of the low period before a load transfer;

S4: determining a value range of a peak-low load transfer ratio $\mu_{pl}$, a value range of a peak-flat load transfer ratio $\mu_{pf}$ and a value range of a flat-low load transfer ratio $\mu_{fl}$ respectively according to the $P_{p,ave}$, $P_{f,ave}$ and $P_{l,ave}$ in S3;

S5: assuming that a total load power before and after the load transfer is unchanged, then calculating a system load after the load transfer, and establishing an objective function minC about a system operating cost after the load transfer, wherein the system operating cost comprises: a generation cost $C_G$ of a thermal power unit, a wind power purchase cost $C_W$, a PV power purchase cost $C_{PV}$ and a compensation cost $C_M$ for a consumer load transfer;

S6: entering constraints, comprising: a system power balance constraint, a positive spinning reserve constraint, a negative spinning reserve constraint, a thermal power unit output constraint, a thermal power unit ramp constraint, a wind power grid-connection ratio constraint, a PV power grid-connection ratio constraint, a peak-low load transfer ratio constraint, a peak-flat load transfer ratio constraint and a flat-low load transfer ratio constraint; and S7: introducing an immune algorithm (IA) to solve and generate an initial population; performing immune operations on the initial population, wherein the immune operations comprise an immune selection, a cloning, a mutation and a cloning suppression; refreshing the initial population until a termination condition is met, and obtaining $\mu_w$, $\mu_{pv}$, $\mu_{pl}$, $\mu_{pf}$ and $\mu_{fl}$ corresponding to a minimum system operating cost, wherein $\mu_w$, $\mu_{pv}$, $\mu_{pl}$, $\mu_{pf}$ and $\mu_{fl}$ are values to perform optimal dispatch of the power system;

wherein $\mu_w$ represents a grid connection ratio of wind power, and $\mu_{pv}$ represents a grid connection ratio of PV power;

the step of S7 further comprising:

S71: generating the initial population as an initial antibody population, and evaluating individuals in the initial antibody population with the system operating cost as an antibody affinity operator;

wherein, the initial population is generated by randomly taking values of the variables $\mu_w$, $\mu_{pv}$, $\mu_{pl}$, $\mu_{pf}$ and $\mu_{fl}$ within the respective value ranges as initial values;

the initial antibody population is a vector composed of $\mu_w$, $\mu_{pv}$, $\mu_{pl}$, $\mu_{pf}$ and $\mu_{fl}$;

S72: performing immune operations on the initial antibody population, wherein the immune operations comprise the immune selection, the cloning, the mutation and the cloning suppression:

the immune selection: selecting high-quality antibodies according to calculation results of antibody affinities and concentration in the initial antibody population, and activating the high-quality antibodies to obtain activated antibodies, wherein the antibody affinities are values of the system operating cost the concentration is a similarity of each value of the system operating cost the high-quality antibodies refer to the corresponding $\mu_w$, $\mu_{pv}$, $\mu_{pl}$, $\mu_{pf}$ and $\mu_{fl}$ in the current population in case of the minimum system operating cost;

the cloning: cloning the activated antibodies to obtain a plurality of copies of the activated antibodies;

the mutation: performing mutation operations on the plurality of copies of the activated antibodies to mutate the antibody affinities;

the cloning suppression: reselecting mutation results, suppressing antibodies with a low affinity, and retaining mutation results of antibodies with a high affinity; and S73: refreshing the initial antibody population and replacing the antibodies with the low affinity in the initial antibody population with another randomly generated antibody to form an another antibody population; determining whether the termination condition is met, wherein the termination condition is that a current number of iterations is greater than or equal to a maximum number of iterations; if the termination condition is met, converging to obtain $\mu_w$, $\mu_{pv}$, $\mu_{pl}$, $\mu_{pf}$ and $\mu_{fl}$ corresponding to the minimum system operating cost if the termination condition is not met, returning to S72.

2. The method for dynamically and economically dispatching the power system based on the optimal load transfer ratio and the optimal grid connection ratio of wind power and PV power according to claim 1, wherein in S1, the output power $P_w$ of the wind turbine in the power system, the output power $P_{pv}$ of the PV power station in the power system and the load power $P_L$ of the power system are expressed as follows:

$$P_w = \{P_{w1}, P_{w2}, \ldots, P_{wt}, \ldots, P_{w24}\}$$

$$P_{pv} = \{P_{pv1}, P_{pv2}, \ldots, P_{pvt}, \ldots, P_{pv24}\}$$

$$P_L = \{P_{L1}, P_{L2}, \ldots, P_{Lt}, \ldots, P_{L24}\}$$

wherein, $P_{wt}$ represents an output power of the wind turbine in a t-th period, $P_{pvt}$ represents an output power of the PV power station in the t-th period, and P Lt represents a load power in the t-th period, t=1, 2, ..., 24.

3. The method for dynamically and economically dispatching the power system based on the optimal load transfer ratio and the optimal grid connection ratio of wind power and PV power according to claim 2, wherein the peak period $T_p$, the flat period $T_f$ and the low period $T_l$ in S3 are calculated as follows:

S31: calculating a total daily load $Q_L$, wherein $$Q_L = \sum_{t=1}^{24} P_{Lt};$$

S32: calculating an hourly average load $Q_L/24$;

S33: regarding the t-th period as the peak period $T_p$ when $P_{Lt} > (1+k) \cdot (Q_L/24)$, regarding the t-th period as the low period $T_l$ when $P_{Lt} < (1-k) \cdot (Q_L/24)$, and regarding the t-th period as the flat period $T_f$ when $(1-k) \cdot (Q_L/24) \leq P_{Lt} \leq (1+k) \cdot (Q_L/24)$, wherein k is a dividing factor of a peak-low period, a flat-low period and the low period, $0 < k < 1$.

4. The method for dynamically and economically dispatching the power system based on the optimal load transfer ratio and the optimal grid connection ratio of wind power and PV power according to claim 3, wherein S4 of determining the value range of the peak-low load transfer ratio $\mu_{pl}$, the value range of the peak-flat load transfer ratio $\mu_{pf}$ and the value range of the flat-low load transfer ratio $\mu_{fl}$ respectively according to the $P_{p,ave}$, $P_{f,ave}$ and $P_{l,ave}$ in S3 is as follows:

$$\begin{cases} \mu_{pl} \in \left[0, \dfrac{P_{p,ave} - P_{l,ave}}{P_{p,ave}}\right] \\ \mu_{pf} \in \left[0, \dfrac{P_{p,ave} - P_{f,ave}}{P_{p,ave}}\right] \\ \mu_{fl} \in \left[0, \dfrac{P_{f,ave} - P_{l,ave}}{P_{f,ave}}\right] \end{cases}.$$

5. The method for dynamically and economically dispatching the power system based on the optimal load transfer ratio and the optimal grid connection ratio of wind power and PV power according to claim 4, wherein in S5, the objective function minC is expressed as:

$$\min C = C_G + C_W + C_{pv} + C_M$$

wherein, $C_w = \theta_w \times Q_w$, $\theta_w$ and $Q_w$, represent an on-grid wind power tariff and an on-grid wind power, respectively;

$$Q_w = \mu_w \times \sum_{t=1}^{24} P_{wt},$$

$\mu_w$ represents a grid connection ratio of wind power;

$C_{PV} = \theta_{pv} \times Q_{pv}$, $\theta_{pv}$ and $Q_{pv}$ represent an on-grid PV power tariff and an on-grid PV power, respectively;

$$Q_{pv} = \mu_{pv} \times \sum_{t=1}^{24} P_{pvt},$$

$\mu_{pv}$ represents a grid connection ratio of PV power;

$$C_M = \begin{cases} \theta_{m1} \times Q_{tran}, & Q_{tran} \le \lambda Q_L \\ \theta_{m1} \times \lambda Q_L + \theta_{m2} \times (Q_{tran} - \lambda Q_L), & Q_{tran} > \lambda Q_L \end{cases},$$

$\lambda$ is a dividing factor of a conventional load and a deep load, $0 < \lambda < 1$; $Q_{tran}$ is a transferred load, $$Q_{tran} = \sum_{t=1}^{24} (P_{Dt} - P_{Lt});$$

$\theta_{m1}$ is a compensation cost for a conventional load transfer; $\theta_{m2}$ is a compensation cost for a deep load transfer; a load of the power system in the t-th period after the load transfer is expressed as:

$$P_{Dt} = \begin{cases} P_{Lt} + \mu_{pl} P_{p,ave} + \mu_{fl} P_{f,ave}, & t \in T_l \\ P_{Lt} + \mu_{pf} P_{p,ave} - \mu_{fl} P_{f,ave}, & t \in T_f \\ P_{Lt} - \mu_{pl} P_{p,ave} - \mu_{pf} P_{f,ave}, & t \in T_p \end{cases};$$

under a conventional peak shaving, the generation cost $C_G$ of the thermal power unit comprises a coal consumption cost, and under a deep peak shaving, the generation cost $C_G$ of the thermal power unit comprises a coal consumption cost, a life loss cost and an oil input cost, $$C_G = \begin{cases} C_T(P_t), & P_{min} \le P_t \le P_{max} \\ C_T(P_t) + C_{life}(P_t), & P_n \le P_t < P_{min} \\ C_T(P_t) + C_{life}(P_t) + C_u(P_t), & P_m \le P_t < P_n \end{cases},$$

wherein $P_{max}$ and $P_{min}$ are respectively a maximum output and a minimum output of the thermal power unit; $P_n$ is a steady combustion load of the thermal power unit under a non-oil-input deep peak shaving; $P_m$ is a steady combustion limit load of the thermal power unit under an oil-input deep peaking shaving; $P_t$ is an output power of the thermal power unit in the t-th period;

the coal consumption cost is $$C_T(P_t) = \sum_{t=1}^{24} (aP_t^2 + bP_t + c),$$

a, b and c are coal consumption cost coefficients of the thermal power unit;

the life loss cost of the thermal power unit under a variable-load peak shaving is calculated by $$C_{life}(P_t) = \frac{\eta C_B}{2N_f(P_t)}$$

by referring to a Manson-Coffin equation, wherein η is an operation influence coefficient of the thermal power unit, indicating a degree of influence of different operating states on a unit loss; $N_f(P_t)$ is a number of rotor cracking cycles determined by a low-cycle fatigue curve of a rotor; $C_B$ is a cost of buying the thermal power unit;

the oil input cost of the thermal power unit is expressed as $C_u(P_t) = C_{oil} \theta_{oil}$, wherein $C_{oil}$ is an oil consumption of the thermal power unit during a steady combustion, and $\theta_{oil}$ is an oil price for the season.

6. The method for dynamically and economically dispatching the power system based on the optimal load transfer ratio and the optimal grid connection ratio of wind power and PV power according to claim 5, wherein in S6, the constraints after the load transfer comprise:

the system power balance constraint: $P_t + P_{wt} + P_{pvt} = P_{Dt}$ the positive spinning reserve constraint: $P_{max} - P_t \ge \eta_1 P_{Dt} + \eta_2 P_{wt}$ the negative spinning reserve constraint: $P_t - P_{min} \ge \eta_3 P_{Dt} + \eta_4 P_{wt}$ the thermal power unit output constraint: $P_{min} \leq P_t \leq P_{max}$ the thermal power unit ramp constraint: $\eta_{down} \leq P_t - P_{t-1} \leq \eta_{up}$ the wind power grid-connection ratio constraint:
$0 \leq \mu_w \leq 1$ the PV power grid-connection ratio constraint:
$0 \leq \mu_{pv} \leq 1$ the peak-low load transfer ratio constraint:

$$0 \leq \mu_{pl} \leq \frac{P_{p,ave} - P_{f,ave}}{P_{p,ave}}$$

the peak-flat load transfer ratio constraint:

$$0 \leq \mu_{pf} \leq \frac{P_{p,ave} - P_{f,ave}}{P_{p,ave}}$$

the flat-low load transfer ratio constraint:

$$0 \leq \mu_{fl} \leq \frac{P_{f,ave} - P_{l,ave}}{P_{f,ave}}$$

wherein, $\eta_1$ and $\eta_3$ represent an up-spinning reserve coefficient and a down-spinning reserve coefficient of the power system to the load, respectively; $\eta_2$ and $\eta_4$ represent an up-spinning reserve coefficient and a down-spinning reserve coefficient of the power system to the output power of the wind turbine, respectively; $\eta_{down}$ and $\eta_{up}$ represent a minimum ramp-down rate and a maximum ramp-up rate of the thermal power unit, respectively; $P_{Dt}$ is the load of the power system in the t-th period after the load transfer; $P_{t-1}$ is an output power of the thermal power unit in a (t−1)-th period.

7. A method for dynamically and economically dispatching a power system based on an optimal load transfer ratio and an optimal grid connection ratio of wind power and photovoltaic (PV) power according to claim 1, wherein the step of S7 further comprises wherein, based on the values, the power system compensates consumers by prompting consumers to transfer loads.

* * * * *